(12) United States Patent
Duvivier

(10) Patent No.: US 8,428,123 B2
(45) Date of Patent: Apr. 23, 2013

(54) EFFICIENT USE OF STORAGE IN ENCODING AND DECODING VIDEO DATA STREAMS

(75) Inventor: Christian L Duvivier, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/450,395

(22) Filed: Apr. 18, 2012

(65) Prior Publication Data

US 2012/0201305 A1 Aug. 9, 2012

Related U.S. Application Data

(60) Division of application No. 12/878,029, filed on Sep. 8, 2010, which is a continuation of application No. 11/071,901, filed on Mar. 1, 2005, now Pat. No. 7,852,916.

(60) Provisional application No. 60/583,447, filed on Jun. 27, 2004.

(51) Int. Cl.
*H04N 7/12* (2006.01)

(52) U.S. Cl.
USPC ............. 375/240.01; 375/240; 375/240.16; 375/240.17; 375/240.22; 375/240.23; 375/240.24; 375/240.25

(58) Field of Classification Search ............ 375/240, 375/240.16, 240.17, 240.22, 240.23, 240.24, 375/240.25, 240.01
See application file for complete search history.

(56) References Cited

U.S. PATENT DOCUMENTS

| | | | |
|---|---|---|---|
| 5,497,404 A * | 3/1996 | Grover et al. ............ | 375/240.27 |
| 5,576,767 A | 11/1996 | Lee et al. | |
| 5,602,956 A | 2/1997 | Suzuki et al. | |
| 5,852,630 A | 12/1998 | Langberg et al. | |
| 5,892,522 A | 4/1999 | Moutin | |
| 5,920,352 A | 7/1999 | Inoue | |
| 6,122,442 A * | 9/2000 | Purcell et al. ............... | 345/620 |
| 6,266,373 B1 * | 7/2001 | Bakhmutsky et al. ... | 375/240.17 |
| 6,529,634 B1 | 3/2003 | Thyagarajan et al. | |

(Continued)

FOREIGN PATENT DOCUMENTS

EP 1610562 12/2005

OTHER PUBLICATIONS

Portions of prosecution history of U.S. Appl. No. 11/071,901, Oct. 25, 2010, Duvivier, Christian, L.

(Continued)

*Primary Examiner* — Kabir A Timory
(74) *Attorney, Agent, or Firm* — Adeli & Tollen LLP

(57) ABSTRACT

Some embodiments facilitate encoding/decoding of a frame by organizing frame data in a storage structure in a novel manner. Specifically, in a portion of the storage structure allocated for a frame slice, used partition entries are stored in a first section of the allocated portion and unused partition entries are stored in a second section of the allocated portion, the first and second sections each comprising a continuous area of storage in the storage structure so that used partition entries are not interspersed with nonused partition entries. In some embodiments, additional data useful in the encoding or decoding of video data is determined and stored into the unused bytes of used partition entries (such as macroblock header data or canonical reference frame index data). In some embodiments, two or more identical partitions of a macroblock are coalesced into a single partition.

6 Claims, 15 Drawing Sheets

U.S. PATENT DOCUMENTS

| | | | |
|---|---|---|---|
| 6,646,578 | B1 | 11/2003 | Au |
| 7,197,076 | B2 * | 3/2007 | Chang et al. ............. 375/240.17 |
| 7,852,916 | B2 | 12/2010 | Duvivier |
| 8,194,730 | B2 | 6/2012 | Duvivier |
| 2002/0039386 | A1 | 4/2002 | Han et al. |
| 2005/0249277 | A1 | 11/2005 | Ratakonda et al. |

OTHER PUBLICATIONS

Portions of prosecution history of U.S. Appl. No. 12/878,029, Apr. 25, 2012, Duvivier, Christian, L.

Portions of prosecution history of EP05291380, Feb. 20, 2012 (mailing date), Apple Inc.

Wiegand, T., et al., "Entropy-Constrained Design of Quadtree Video Coding Schemes," Proceedings of the $6^{th}$ International Conference on Image Processing and Its Applications, Jul. 14-17, 1997, pp. 36-40, vol. 1, IEEE, London, UK.

Yap, Swee Yeow, et al., "A VLSI Architecture for Advanced Video Coding Motion Estimation," Proceedings of the Application-Specific Systems, Architectures, and Processors, Jun. 24-26, 2003, 9 pages, IEEE, Piscataway, NJ, USA.

\* cited by examiner

1.

2.

3.

4.

Entry Numbers

|   | 0 | 1 | 2 | 3 | 4 |
|---|---|---|---|---|---|
| Canonical reference frame list: | 0 | 1 | 2 | 4 | 5 |

Entry Numbers

|   | 0 | 1 | 2 |
|---|---|---|---|
| First reference frame list: | 2 | 1 | 0 |
| Second reference frame list: | 4 | 5 | 6 |

Fig. 13

EFFICIENT USE OF STORAGE IN ENCODING AND DECODING VIDEO DATA STREAMS

CLAIM OF BENEFIT TO PRIOR APPLICATIONS

This application is a divisional application of U.S. patent application Ser. No. 12/878,029, filed Sep. 8, 2010, now published as U.S. Publication 2010/0329349. U.S. patent application Ser. No. 12/878,029 is a continuation application of U.S. patent application Ser. No. 11/071,901, filed Mar. 1, 2005, now issued as U.S. Pat. No. 7,852,916. U.S. patent application Ser. No. 11/071,901 claims the benefit to U.S. Provisional Patent Application 60/583,447, entitled "Encoding and Decoding Images," filed Jun. 27, 2004. U.S. Pat. No. 7,852,916 and U.S. Publication 2010/0329349 are incorporated herein by reference.

FIELD OF THE INVENTION

The present invention is directed towards the efficient use of storage in the encoding and decoding of video data streams.

BACKGROUND OF THE INVENTION

Video codecs (COmpressor-DECompressor) are compression algorithms designed to encode/compress and decode/decompress video data streams to reduce the size of the streams for faster transmission and smaller storage space. While lossy, video codecs attempt to maintain video quality while compressing the binary data of a video stream. Examples of popular video codecs are MPEG-4, AVI, WMV, RM, RV, H.261, H.263, and H.264.

A video stream is comprised of a sequence of video frames where each frame is comprised of multiple macroblocks. A video codec encodes each frame in the sequence by dividing the frame into one or more slices or sub-portions, each slice containing an integer number of macroblocks. A macroblock is typically a 16×16 array of pixels (although other sizes of macroblocks are also possible) and can be divided into partitions for encoding and decoding. As an example, FIG. 1 illustrates the different ways that a macroblock can be partitioned in the H.264 compression standard. As shown in FIG. 1, a macroblock can be partitioned in one of 259 possible ways:

1. one partition
2. two vertical partitions
3. two horizontal partitions and
4. four smaller square partitions.

In the last case, each resulting square partition can be partitioned in a similar manner (accounting for the other 256 ways to partition a macroblock) for up to a maximum of 16 partitions for a single macroblock.

Macroblock content can be self-contained or predicted from one or two different frames. In a received bitstream (created during the encoding process), the following predictive information can be derived for each partition: a motion vector (comprised of x and y components) and an associated indicator to a frame (in a sequence of frames) that the motion vector is based upon. This indicator may be, for example, a reference frame index that is used in conjunction with an associated reference frame list to indicate from which particular frame the motion vector is based upon.

FIG. 2 illustrates the concept of reference frame indexes and reference frame lists. For each slice of a frame, there is stored one or more reference frame lists that are used to identify particular frames for motion vectors. In the example of FIG. 2, a first and second reference frame list is used to identify particular frames for motion vectors. Typically, when a slice is received, the header of the slice contains information to derive the frame reference lists.

A reference frame index associated with a motion vector specifies an entry (containing a frame number) in a reference frame list that indicates the frame in a sequence of frames that the motion vector is based upon. In the example of FIG. 2, there are seven active frames (i.e., frames that are presently held in storage) numbered 0 through 6. The frame numbered "3" is currently being processed. If a reference frame index specifies a value of 0 for an associated first motion vector, this indicates that the frame number in the first entry of the first reference frame list is the frame that the motion vector is based upon. Therefore, as shown in the example of FIG. 2, the frame numbered "2" is the frame that the first motion vector is based upon. As a further example, if a reference frame index specifies a value of 2 for an associated second motion vector, this indicates that the frame number in the third entry of the second reference frame list (for second motion vectors) is the frame that the second motion vector is based upon. Therefore, as shown in the example of FIG. 2, the frame numbered "6" is the frame that the second motion vector is based upon.

FIG. 3 shows a conceptual diagram of a conventional storage structure 305 containing partition data for a slice of a frame. In the example of FIG. 3, the slice is comprised of three macroblocks where a first macroblock (macroblock 0) is comprised of 1 partition, a second macroblock (macroblock 1) is comprised of 16 partitions, and a third macroblock (macroblock 2) is comprised of 2 partitions.

Typically, during decoding, storage is allocated for a slice on a "worst case scenario" basis that assumes each macroblock of the slice is divided into the maximum number of partitions (e.g., 16 partitions under H.264 standards). As such, under H.264 standards, for each macroblock of the slice, there is allocated enough storage space for a header and 16 partition entries. A partition entry in a data structure stores partition data during decoding of a frame. Each partition entry contains data for a single partition (e.g., motion vector and reference frame index data).

The diagram of FIG. 3 shows an allocated portion 310 of the storage structure that has been allocated for the slice. Since each macroblock of a slice will typically not be divided into 16 partitions, a macroblock will often be allocated storage for more partition entries than partitions contained in the macroblock. As such, the allocated portion of the storage structure for a macroblock will typically contain one or more used partition entries (entries that contain data for an actual partition of the macroblock) as well as one or more unused partition entries (entries that do not contain data for a partition of the macroblock). A used partition entry contains meaningful/useful data (such as motion vector and reference frame index data for a partition) whereas unused partition entries do not contain meaningful/useful data.

As shown in FIG. 3, for each macroblock of the slice, the storage structure contains a header section and a partition entry section. Typically, during decoding, storage is allocated for a header on a "worst case scenario" basis that assumes that the macroblock is divided into 16 partitions. As such, for each macroblock header, there is allocated enough storage space for 16 header partition entries. A conventional header for a macroblock contains data describing how the macroblock is partitioned. Such descriptive data includes, for example, position and dimension data of each partition. FIG. 4 shows a conceptual diagram of a conventional header 405 stored in the storage structure for macroblock 2. Macroblock 2 is divided into 2 partitions. As such, the header will include 2 used header partition entries, each entry containing descriptive data of a particular partition. The remaining 14 header partition entries will be empty (unused). In addition, each header typically contains data indicating the number of partitions in the macroblock.

As shown in FIG. 3, a first portion 315 of the storage structure 305 contains data for macroblock 0. Since macroblock 0 is comprised of 1 partition, the storage structure contains a used partition entry (partition entry 0) only for a first partition of macroblock 0, while the remaining 15 partition entries allocated for macroblock 0 (partition entries 1-15) are unused entries. A second portion 320 of the storage structure 305 contains data for macroblock 1. Since macroblock 1 is comprised of 16 partitions, the storage structure contains a used partition entry (partition entries 0-15) for a first through sixteenth partition of macroblock 1 so that all entries allocated for macroblock 1 is used. A third portion 325 of the storage structure 305 contains data for macroblock 2. Since macroblock 2 is comprised of 2 partitions, the storage structure contains used partition entries for a first and second partition of macroblock 2, while the remaining 14 partition entries allocated for macroblock 2 are unused.

As such, the partition data for the slice is typically stored in the storage structure in a haphazard pattern where unused partition entries are interspersed with used partition entries. This haphazard pattern of data storage in the storage structure causes decoding of the slice to be inefficient. This is due to the fact that when a CPU is loading partition data from storage during decoding, it retrieves chunks of memory (such as adjacent partition data) from the storage structure rather than retrieving only the precise data the CPU requires at the moment. The retrieved chunks of data may contain used and unused partition entries. The retrieved chunks of data are stored in a cache (e.g., CPU cache) that the CPU can access quickly (typically in a significantly shorter time than the CPU can access the storage structure).

If the CPU later needs particular partition data during processing of the slice, the CPU first determines if the particular partition data exists in the cache since the particular partition data may have been included a previously retrieved chunk of data and the access time to the cache is shorter than to the storage structure. If the particular partition data exists in the cache, this is referred to as a "cache hit" where retrieval of the particular partition data from the cache is fast. If the particular partition data does not exist in the cache, this is referred to as a "cache miss" and the CPU must then retrieve the particular partition data from the storage structure which is slower.

When partition data is stored in the storage structure in a haphazard manner where unused partition entries are interspersed with used partition entries, there is typically a higher rate of "cache misses" during processing of the slice since the retrieved chunks of data will also contain unused partition entries interspersed with used partition entries, where the unused partition entries contain non-useful data.

As such, there is a need for a method of organizing partition data in the storage structure that allows for more efficient processing of the partition data.

SUMMARY OF THE INVENTION

Some embodiments of the present invention facilitate encoding/decoding of a frame by organizing data of the frame in a storage structure in a novel manner. Specifically, in a portion of the storage structure that has been allocated for a frame slice, used partition entries (entries containing useful data) are stored in a first section of the allocated portion and the unused partition entries (entries not containing useful data) are stored in a second section of the allocated portion, the first and second sections comprising continuous and adjacent areas of storage in the storage structure. In some embodiments, the used partition entries are "packed" into a first section of the allocated portion of the storage structure while the unused partition entries occupy the remainder of the allocated portion.

In some embodiments, additional data useful in the encoding or decoding of video data is determined/identified and stored into the unused bytes of used partition entries. In some embodiments, the header data for a macroblock is stored in a particular partition entry of the macroblock (e.g., the first partition entry for a first partition of the macroblock). In these embodiments, the header data is integrated with partition data of a partition entry. In some embodiments, canonical reference frame index data is calculated and stored into the unused bytes of used partition entries. In some embodiments, partitions of a macroblock are compared to determine whether any partitions of the macroblock are identical, whereby identical partitions are coalesced into a single partition of the macroblock.

BRIEF DESCRIPTION OF THE DRAWINGS

FIG. 13 shows an example of a canonical reference frame list.

DETAILED DESCRIPTION

The disclosure of U.S. Provisional Patent Application "Encoding and Decoding Images," having Ser. No. 60/583, 447 filed on Jun. 27, 2004, is hereby expressly incorporated herein by reference.

In the following detailed description of the invention, numerous details, examples and embodiments of the invention are set forth and described. However, it will be clear and apparent to one skilled in the art that the invention is not limited to the embodiments set forth and that the invention may be practiced without some of the specific details and examples discussed.

Partition Entries:

In some embodiments, a partition entry for a partition is aligned to have a predetermined length to speed the decoding of the partition. Due to alignment concerns, data is typically divided into multiples of a particular number of bytes. In these embodiments, each partition entry is aligned to be the same number of predetermined bytes.

Figure 5:
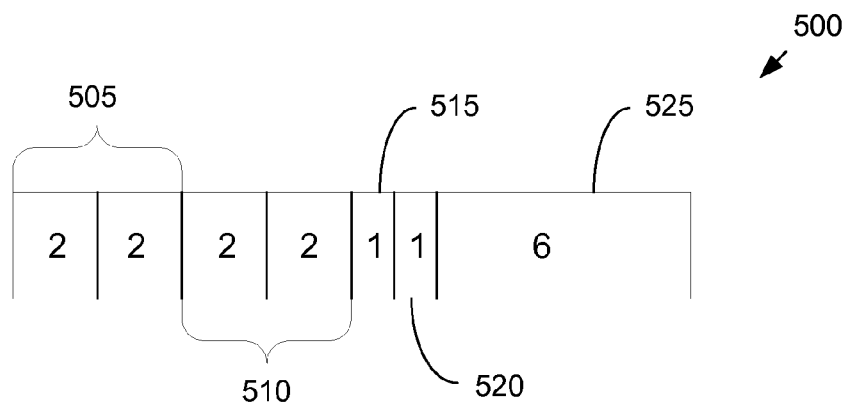
FIG. 5 shows the composition of a partition entry in a data structure that stores partition data during decoding of a frame.

FIG. 5 shows the composition of a partition entry 500 in a data structure that stores partition data during decoding of a frame. Each partition entry contains data for a single partition (i.e., motion vector and reference frame index data). In the example shown in FIG. 5, a partition entry is 16 bytes long. As shown, data for a first motion vector 505 comprises four bytes of data and data for a second motion vector 510 also comprises four bytes of data in the partition entry (two bytes for each x or y component of a motion vector). The data for a first reference frame index 515 comprises one byte and data for a second reference frame index 520 also comprises one byte of data in the partition entry. As shown in the example of FIG. 5 where a partition entry has 16 bytes, a partition entry contains ten used bytes where six bytes 525 of the entry are typically empty and unused (i.e., do not contain meaningful or useful data).

Efficient Use of Storage During Encoding/Decoding:

In some embodiments, to facilitate encoding/decoding of a slice of a frame, data of the slice is organized in the storage structure so that used partition entries are not interspersed with unused partition entries. Specifically, in a portion of the storage structure that has been allocated for the slice, used partition entries are stored in a first section of the allocated portion and the unused partition entries are stored in a second section of the allocated portion, the first and second sections each comprising a continuous and adjacent area of storage in the storage structure. In some embodiments, the used partition entries are "packed" into a first predetermined section of the allocated portion of the storage structure while the unused partition entries occupy the remainder of the allocated portion.

Associated with the allocated portion of the storage structure is a locator list that is a list of indexes for the partition entries contained in the allocated portion. Specifically, the locator list comprises a list of indexes (e.g., pointers) that contain location information (e.g., address information) of partition entries in the allocated portion. The locator list is used in conjunction with the allocated portion to locate a particular partition entry of a particular macroblock in the allocated portion.

In some embodiments, header data for each macroblock is stored in the first section of the allocated portion where the used partition entries are stored. In some embodiments, the header data for a macroblock is stored in the first section but stored separate from any partition entry of the macroblock. In other embodiments, the header data for a macroblock is stored in a particular partition entry of the macroblock (e.g., the first partition entry for a first partition of the macroblock). In these embodiments, the header data is integrated with partition data of a partition entry.

Figure 3:
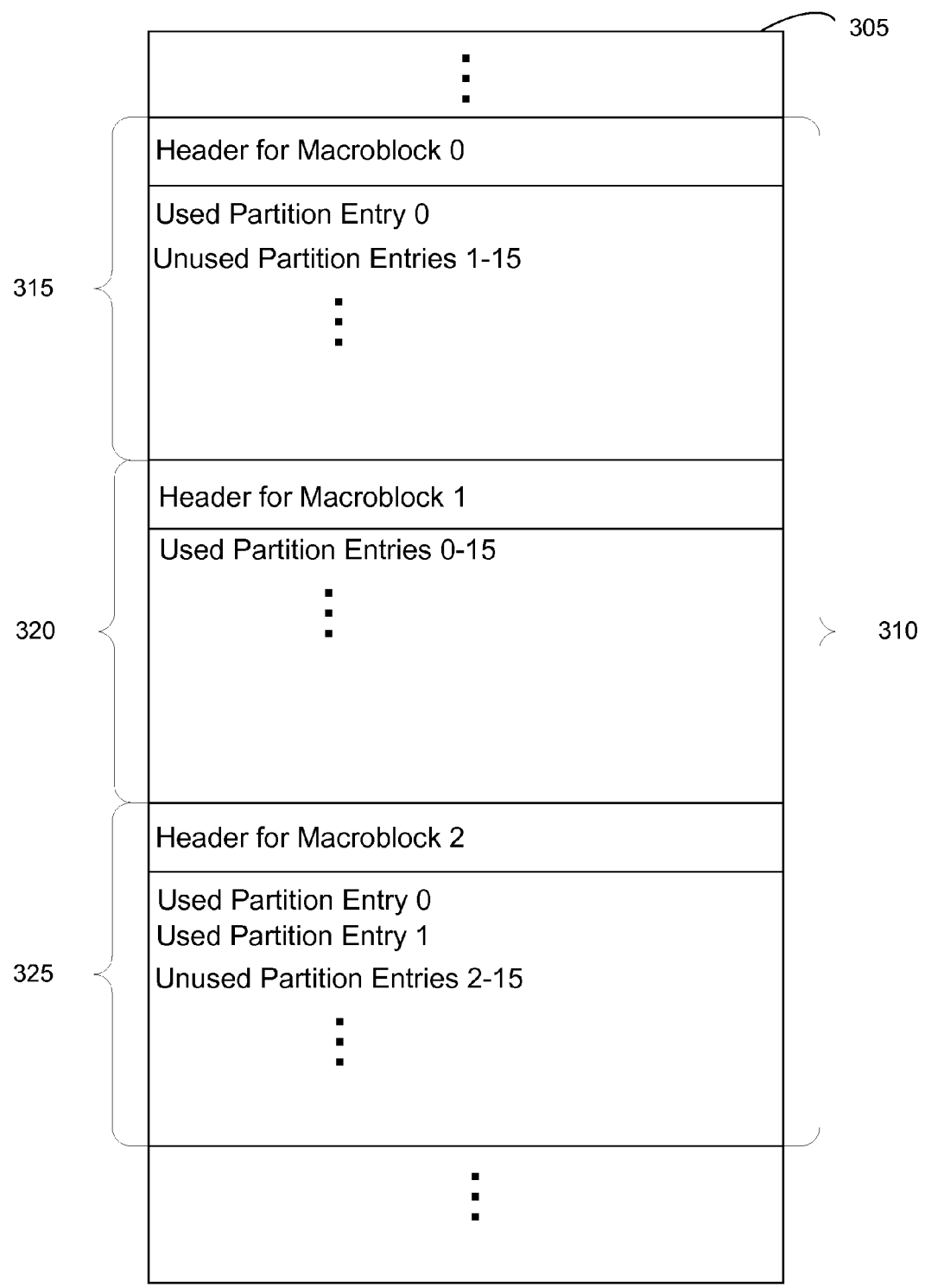
FIG. 3 shows a conceptual diagram of a conventional storage structure containing partition data for a slice of a frame.
Figure 4:
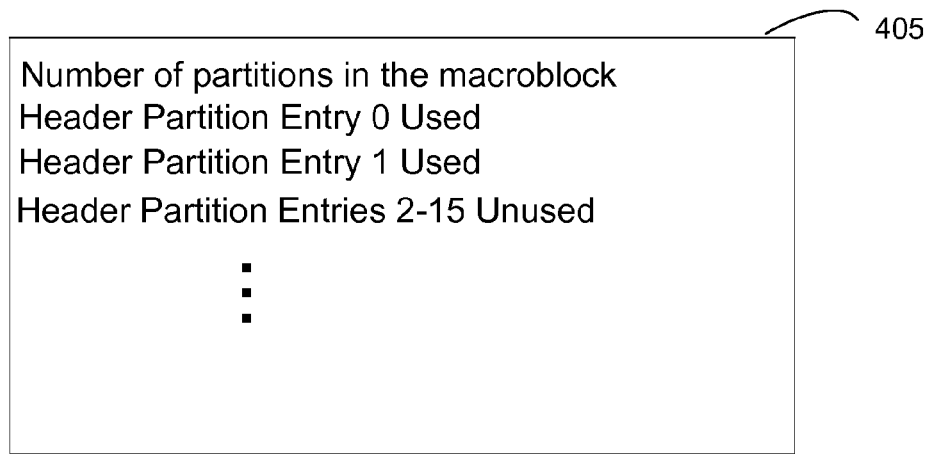
FIG. 4 shows a conceptual diagram of a conventional header stored in the storage structure.
Figure 6:
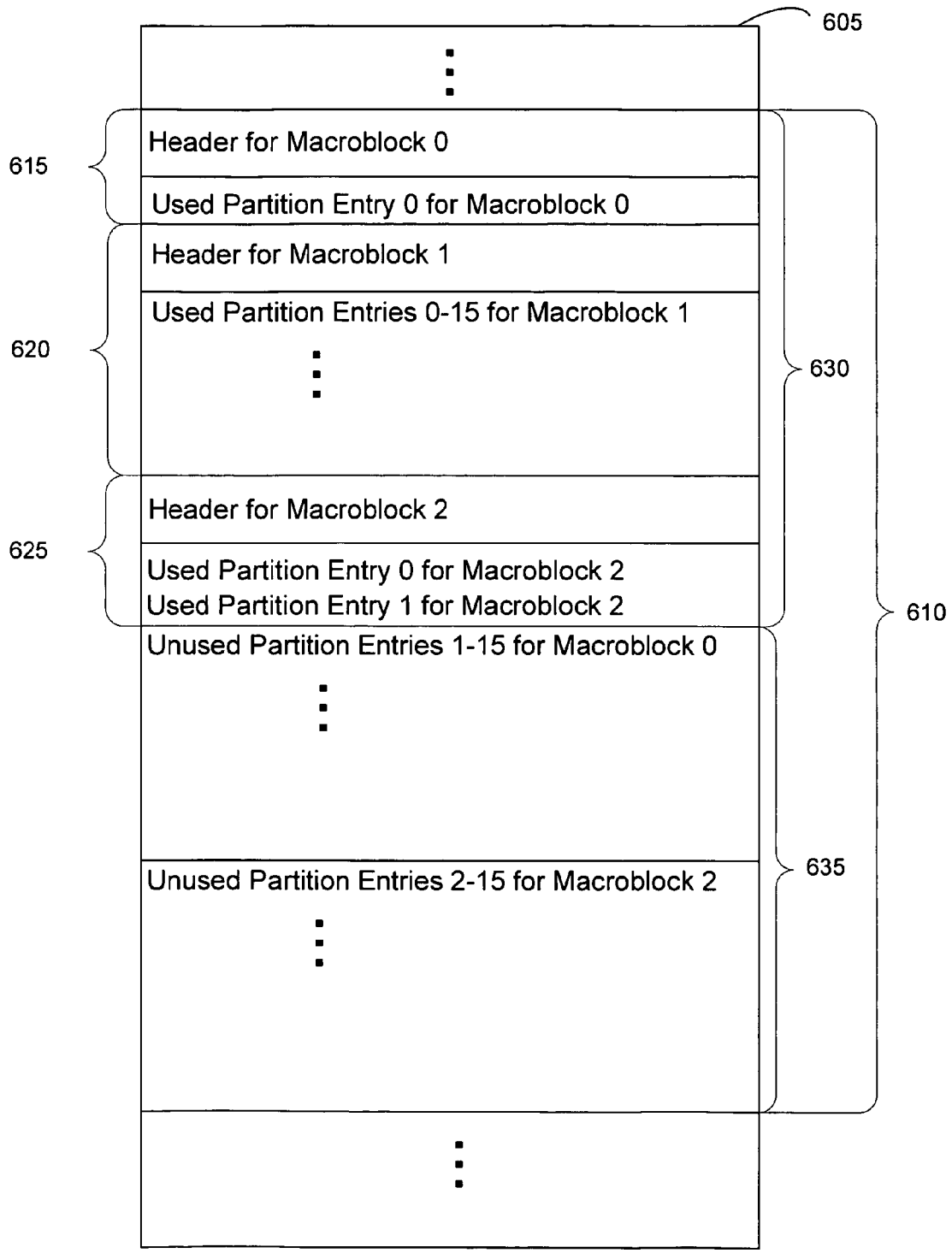
FIG. 6 shows a conceptual diagram of a storage structure containing partition data for a slice of a frame, the partition data being organized in the storage structure in accordance with the present invention

FIG. 6 shows a conceptual diagram of a storage structure 605 containing partition data for a slice of a frame, the partition data being organized in the storage structure in accordance with the present invention. In the example of FIG. 6, the slice is comprised of the same three macroblocks as in the example of FIG. 3, whereby a first macroblock (macroblock 0) is comprised of 1 partition, a second macroblock (macroblock 1) is comprised of 16 partitions, and a third macroblock (macroblock 2) is comprised of 2 partitions.

The size of storage portion 610 allocated for the slice is determined based on a "worst case scenario" so that for each macroblock of the slice, there is allocated enough storage space for a header and 16 partition entries (where each partition entry comprises 16 bytes of data). As such, for macroblock 0, there is one used partition entry (partition entry 0) and 15 unused partition entries (partition entries 1-15); for macroblock 1, there are 16 used partition entries; and for macroblock 2 there are two used partition entries and 14 unused partition entries.

As shown in FIG. 6, the used partition entries of all macroblocks of the slice are stored ("packed") to a first section 630 of the allocated portion of the storage structure while the unused partition entries are stored to a second section 635 of the allocated portion (the remainder of the allocated portion). For macroblock 0, the header data and used partition entry 0 are in a sub-division 615 of the first "used" section 630 for macroblock 0. The unused partition entries 1-15 for macroblock 0 are in the second "unused" section 635 of the allocated portion. For macroblock 1, the header data and used partition entries 0-15 are in a sub-division 620 of the first "used" section 630 for macroblock 1. For macroblock 2, the header data and used partition entries 0-1 are in a sub-division 625 of the first "used" section 630 for macroblock 2. The unused partition entries 2-15 for macroblock 2 are in the second "unused" section 635 of the allocated portion. This is in contrast to FIG. 3 where the used and unused partition entries are interspersed throughout the allocated portion 310 of the storage structure 305.

Organizing the partition data in such a manner allows decoding of the slice to be more efficient since fewer cache misses will be encountered. When the CPU retrieves chunks of partition data from the first section of the allocated portion, each chunk of partition data will be comprised completely or mostly of used partition entries since the used partition entries have been packed into the first section and the unused partition entries packed into a second separate section. This causes fewer cache misses since the cache will thereby contain a larger proportion of meaningful/useful data from the used partition entries.

Figure 7:
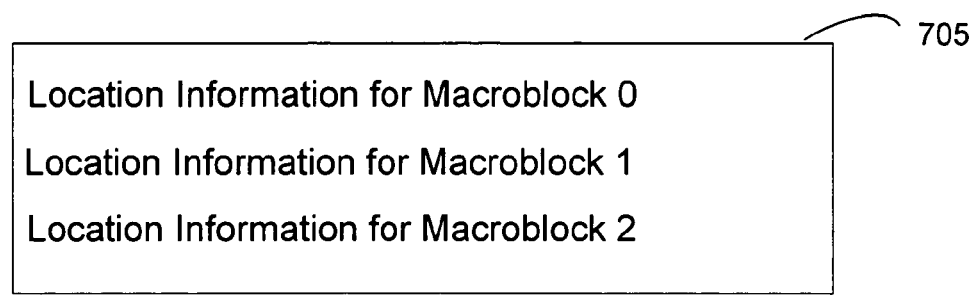
FIG. 7 shows a conceptual diagram of a locator list associated with the allocated portion of the storage structure shown in FIG. 6.

FIG. 7 shows a conceptual diagram of a locator list 705 associated with the allocated portion 610 of the storage structure 605 shown in FIG. 6. The locator list is a list of indexes (e.g., pointers) that contain location information (e.g., address information) that are used to help locate partition entries in the allocated portion. The locator list is used in conjunction with the allocated portion to help locate a particular partition entry of a particular macroblock in the allocated portion.

In some embodiments, only one index for a macroblock is stored in the locator list 705. In some embodiments, an index only to a first partition entry for a first partition of a macroblock is stored in the locator list 705. In these embodiments, an index in the list identifies the macroblock number in the slice and the location information of the first partition entry for the macroblock in the allocated portion 610 of the storage structure 605. For example, as shown in FIG. 7, an index for macroblock 0 contains location information of the first partition entry for macroblock 0 in the allocated portion 610.

Figure 8:
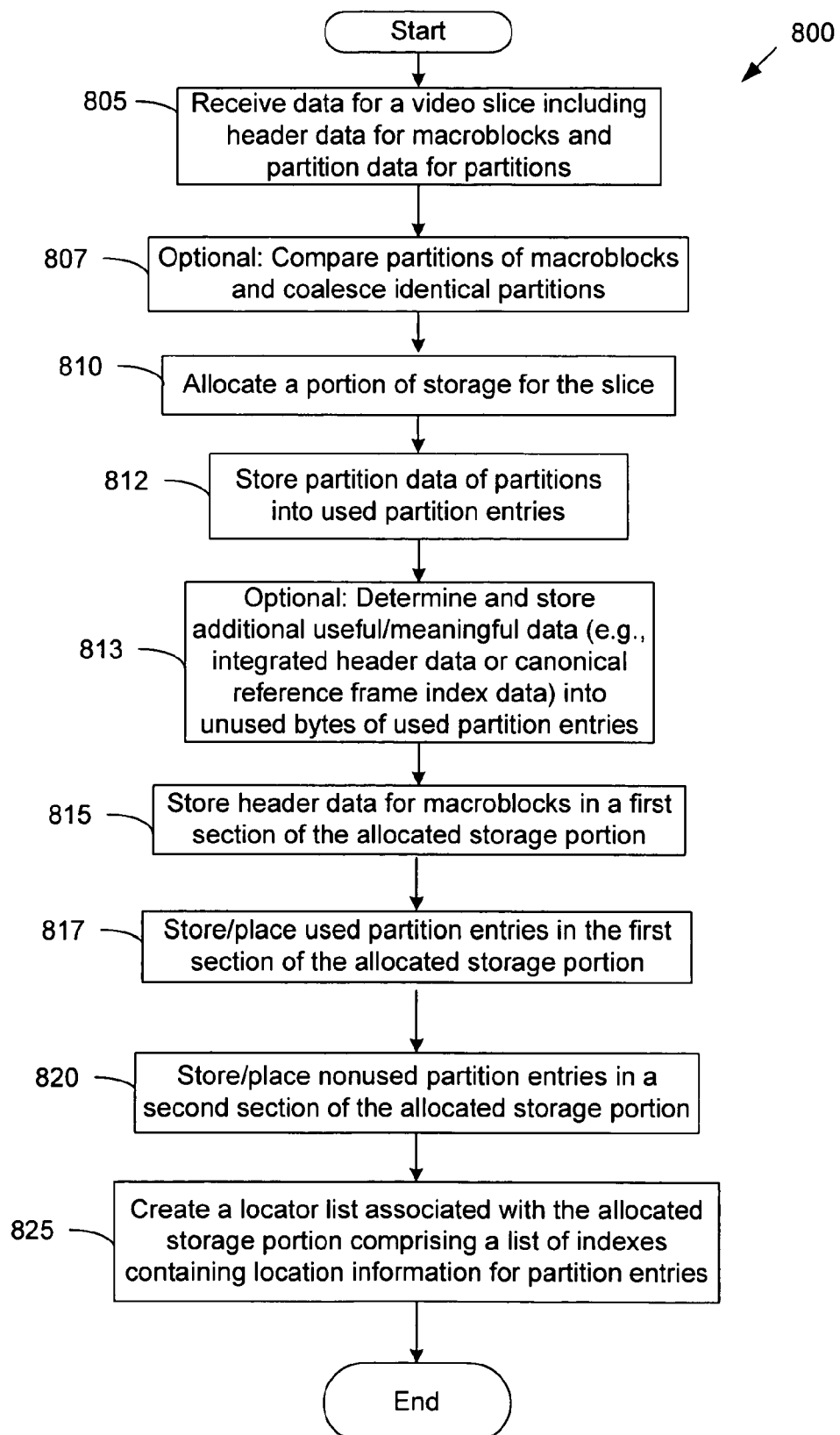
FIG. 8 is a flowchart of a method for storing data for a slice of a video frame.

FIG. 8 is a flowchart of a method 800 for storing data for a slice of a video frame. The method 800 may be performed, for example, by an application configured to encode or decode video data streams using a data storage structure.

The method 800 begins by receiving (at 805) data for a slice of a video frame, the slice containing two or more macroblocks where each macroblock comprises one or more partitions. The data for the slice includes partition data (e.g., motion vector and reference frame index data) associated with partitions of the macroblocks of the slice and header data for each macroblock. As an optional step, for each macroblock, the method compares (at 807) partitions of the macroblock and coalesces (at 807) any identical partitions (as discussed below).

The method 800 then allocates (at 810) a portion of the storage structure for storing data of the slice, the allocated storage portion comprising allocated storage for partition entries and macroblock headers. In some embodiments, the size of the allocated storage portion is determined according to a predetermined number of partition entries to be allocated for each macroblock of the slice. In some embodiments, the size of the allocated storage portion is determined based on a "worst case scenario" so that for each macroblock of the slice, there is allocated enough storage space for the macroblock header and 16 partition entries.

The method then stores (at 812) partition data associated with partitions of the slice into the allocated partition entries (referred to as used partition entries). As an optional step, the method determines and stores (at 813) additional useful/meaningful data into the unused bytes of used partition entries (as discussed below). In some embodiments, the method calculates and stores (at 813) integrated header data or canonical reference frame index data into used partition entries. In some embodiments, the method calculates/identifies and stores any other data that is useful in the encoding or decoding of the partition.

The method 800 then stores (at 815) header data for each macroblock in a first section of the allocated storage portion. The method 800 also stores/places (at 817) used partition entries in the first section of the allocated storage portion, wherein a used partition entry contains data for a partition of a macroblock of the slice. The method 800 also stores/places (at 820) nonused partition entries (entries not containing data of a partition) in a second section of the allocated storage portion. In some embodiments, the first and second sections each comprise a continuous area of storage in the allocated storage portion whereby used partition entries are not interspersed with nonused partition entries in the allocated storage portion.

The method 800 then creates (at 825) a locator list that is associated with the allocated storage portion, the locator list comprising a list of indexes (e.g., pointers) that contain location information (e.g., address information) for partition entries in the allocated portion. The locator list is used to help locate a particular partition entry of a particular macroblock in the allocated portion. In some embodiments, an index only to a first partition entry for a first partition of a macroblock is stored in the locator list. The method then ends.

Uses of Unused Bytes in a Partition Entry:
Integrated Headers

As shown in FIG. 6, for each macroblock, there is macroblock header data that is also stored in the first section of the allocated portion where the used partition entries are stored. In some embodiments, the header data for a macroblock is stored in the first section but stored separate from any partition entry of the macroblock. In other embodiments, the header data for a macroblock is stored in a particular partition entry of the macroblock. In these embodiments, the header data is integrated with partition data of a partition entry.

Figure 9:
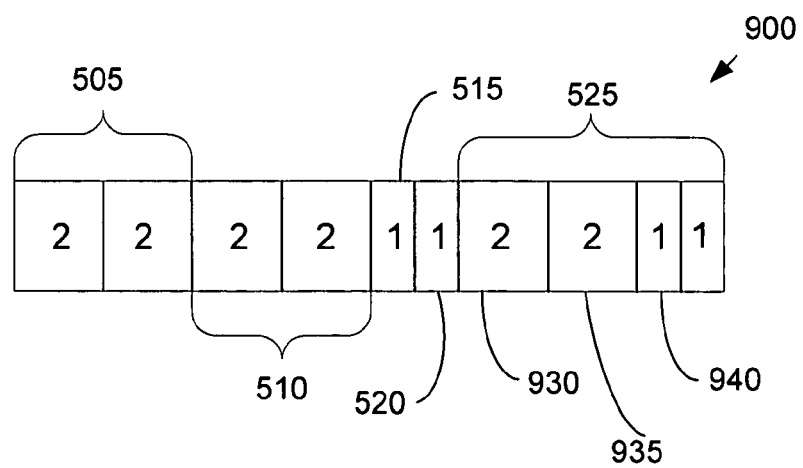
FIG. 9 shows the composition of a partition entry containing useful data in the 6 unused bytes of the entry.

As shown in the example of FIG. 5, a partition entry may be 16 bytes long. As shown in FIG. 5, partition data (motion vector and reference frame index data) comprise 10 bytes 505-520 of a partition entry leaving six bytes 525 of the partition entry unused. FIG. 9 shows the composition of a partition entry 900 in accordance with the present invention where the partition entry 900 contains useful data in the 6 unused bytes 525 of the entry.

In some embodiments, header data for a macroblock is stored in the unused bytes of a particular partition entry of the macroblock. In some embodiments, the header data of the macroblock is integrated only into a first partition entry for a first partition of the macroblock. In some embodiments, integrated header data 930 comprises 2 bytes of the unused bytes 525 of a partition entry 900.

Figure 10:
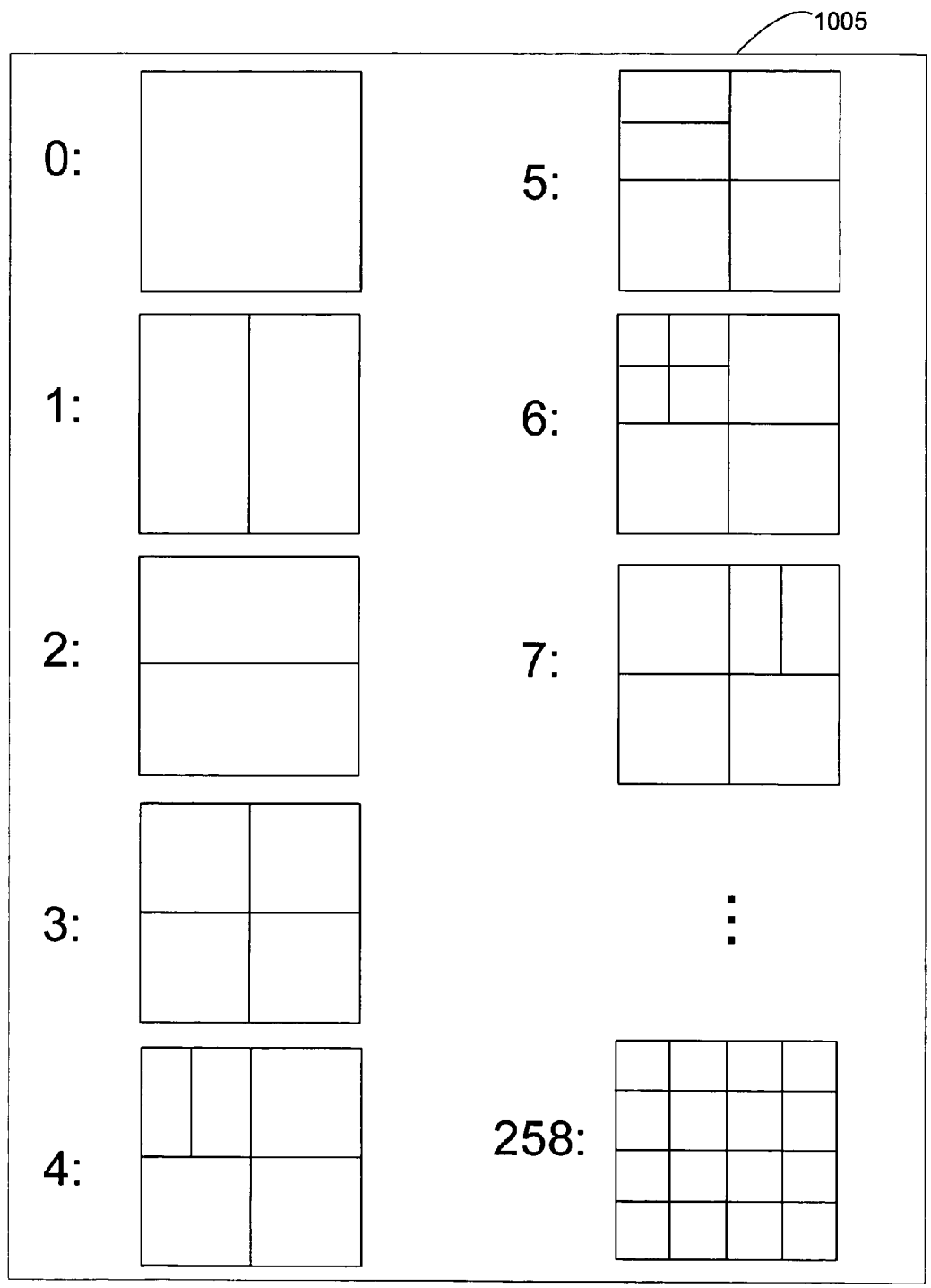
FIG. 10 shows a look-up table for the H.264 standard.

The integrated header data 930 is used in conjunction with a partition configuration look-up table to identify a unique partition configuration of the macroblock. As discussed above, under H.264 standards, a macroblock can be partitioned into 259 different possible partition configurations. In these embodiments, a look-up table is generated that contains each of the 259 different possible partition configurations and a unique identifier associated with each partition configuration (e.g., ranging from 0-258). An example of a look-up table 1005 for the H.264 standard is shown in FIG. 10. In these embodiments, for each macroblock, the integrated header data identifies a particular partition configuration in the look-up table that indicates the partition configuration of the macroblock (where the value of the integrated header data is matched to the unique identifier associated with the particular partition configuration).

Recall that a conventional header for a macroblock contains descriptive data on how the macroblock is partitioned and includes, for example, position and dimension data of each partition in the macroblock relative to the macroblock. This conventional descriptive data can be derived from the unique partition configuration of a macroblock since the partition configuration will indicate the position and dimension data of each partition in the macroblock relative to the macroblock. As such, once the unique partition configuration of the macroblock is determined, the descriptive data typically contained in a header can also be determined.

Figure 11:
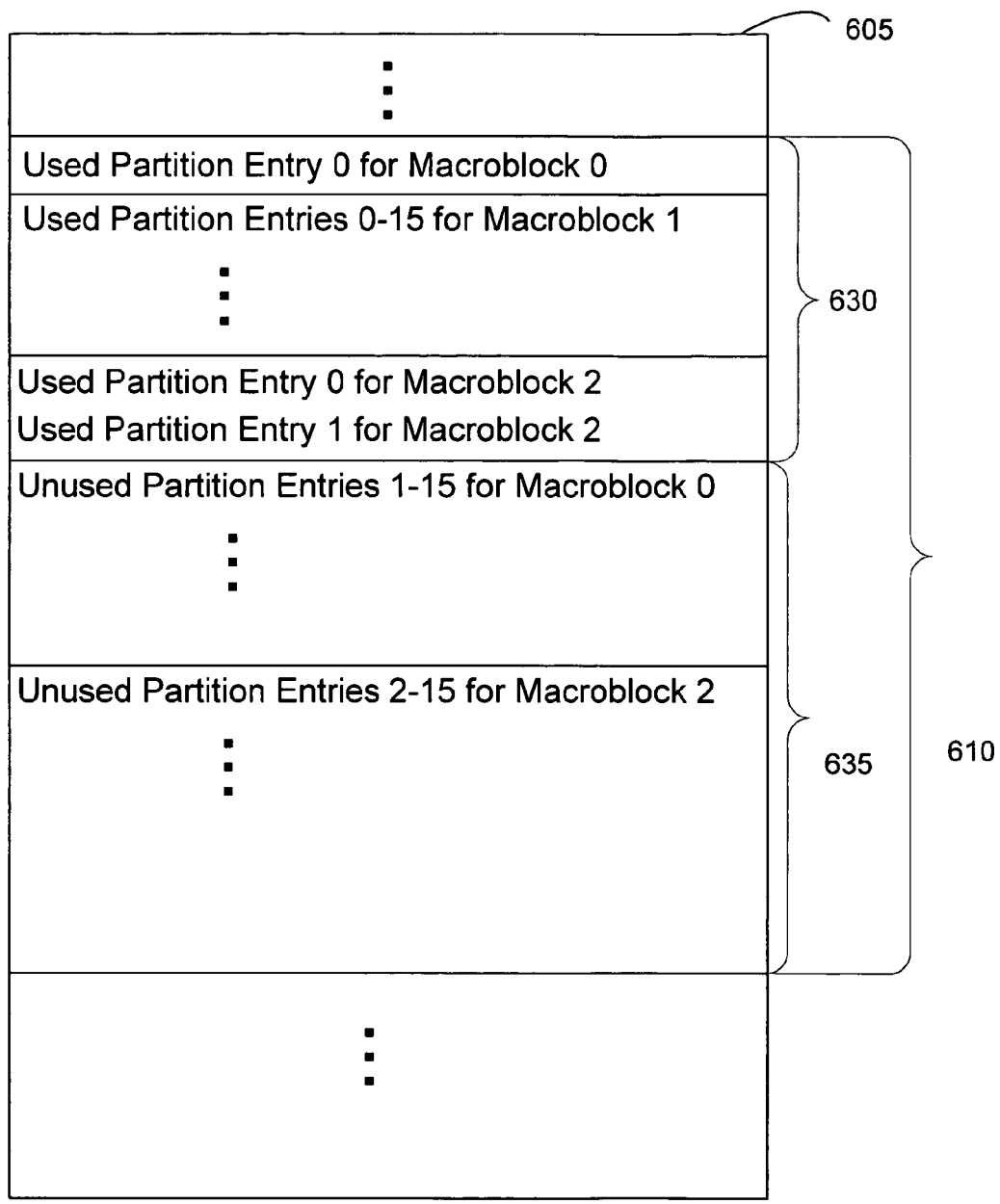
FIG. 11 shows a conceptual diagram of a storage structure containing partition data for a slice of a frame where header data has been integrated into partition entries.

Storage consumption will be reduced using integrated header data since integrated header data is stored in unused portions of partition entries and separate storage space for conventional headers will not be needed. FIG. 11 shows a conceptual diagram of a storage structure containing partition data for a slice of a frame where header data has been integrated into partition entries. Note that, as compared to FIGS. 3 and 6, a separate header section for each macroblock is no longer needed.

Figure 12:
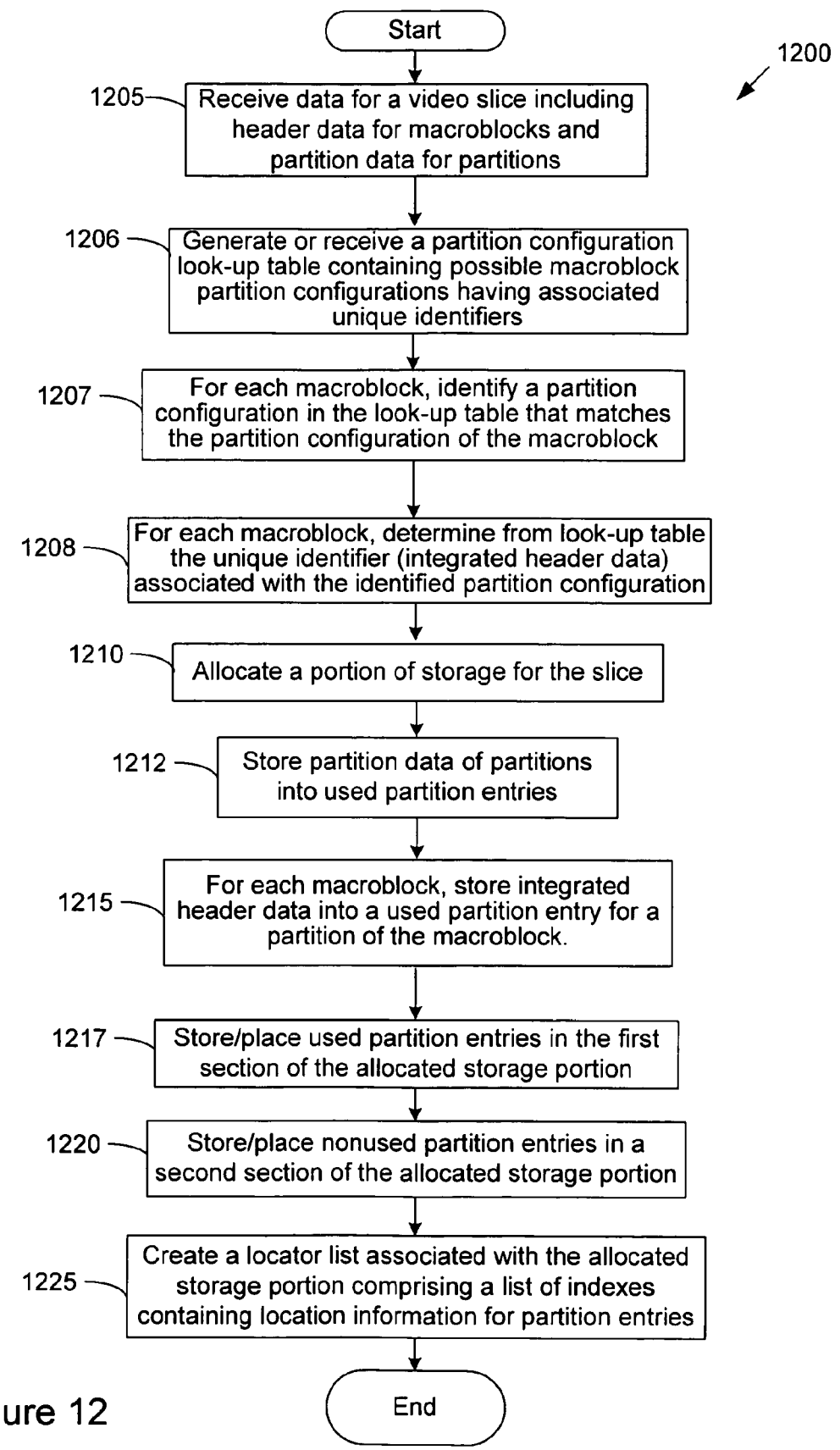
FIG. 12 is a flowchart of a method for storing data for a slice of a video frame using integrated headers.

FIG. 12 is a flowchart of a method 1200 for storing data for a slice of a video frame using integrated headers. The method 1200 may be performed, for example, by an application configured to encode or decode video data streams using a data storage structure.

The method 1200 begins by receiving (at 1205) data for a slice of a video frame, the slice containing two or more macroblocks where each macroblock comprises one or more partitions. The data for the slice includes partition data (e.g., motion vector and reference frame index data) associated with partitions of the macroblocks of the slice and header data for each macroblock that contain data describing how the macroblock is partitioned (e.g., position and dimension data of each partition in the macroblock).

The method 1200 then generates or receives (at 1206) a partition configuration look-up table that contains each possible partition configuration of a macroblock, each possible partition configuration having an associated unique identifier (e.g., a numerical identifier). For each macroblock of the slice, the method 1200 then identifies (at 1207) a particular partition configuration in the look-up table that matches the partition configuration of the macroblock. The method 1200 then determines (at 1208) from the look-up table the unique identifier associated with the identified partition configuration. The associated unique identifier is referred to herein as the integrated header data for a macroblock. The method may identify (at 1207) the particular partition configuration of the macroblock using the received header data for a macroblock that contains data describing how the macroblock is partitioned. As such, the integrated header data for a macroblock is derived (at steps 1207 and 1208) from the original received header data for the macroblock.

The method 1200 then allocates (at 1210) a portion of the storage structure for storing data of the slice. In some embodiments, the size of the allocated storage portion is determined without taking into consideration separate storage sections for header data of macroblocks of the slice. In these embodiments, a predetermined number of partition entries are allocated for each macroblock of the slice while no separate storage section is allocated for the header data of each macroblock (as shown in FIG. 11).

The method then stores (at 1212) partition data associated with partitions of the slice into the allocated partition entries (referred to as used partition entries). The method 1200 then stores (at 1215) the integrated header data for each macroblock (determined at step 1208) into a used partition entry for a partition of the macroblock. The method may do so by storing the integrated header data in any unused bytes of a partition entry of the macroblock. In some embodiments, the integrated header data for a macroblock is stored only into a first used partition entry for a first partition of the macroblock. In some embodiments, integrated header data comprises 2 bytes of the unused bytes of a used partition entry.

In some embodiments, the method 1200 then stores/places (at 1217) used partition entries in a first section of the allocated storage portion. In some embodiments, the method 1200 also stores/places (at 1220) nonused partition entries (entries not containing data of a partition) in a second section of the allocated storage portion. In some embodiments, the method 1200 then creates (at 1225) a locator list that is associated with the allocated storage portion, the locator list comprising a list of indexes that contain location information for partition entries in the allocated portion. The method then ends.

Canonical Reference Frame Indexes

In some embodiments, canonical reference frame indexes are calculated and stored in the unused bytes of each partition entry. In these embodiments, first and second reference frame indexes in a partition entry are mapped to canonical reference frame indexes, respectively.

As discussed above in relation to FIG. 2, a reference frame index associated with a motion vector specifies an entry (containing a frame number) in a reference frame list that indicates the frame that the motion vector is based upon. Since the first and second reference frame lists may vary for each slice of a frame, it is not possible to determine with any assurance whether reference frame indexes having the same value in different partition entries of different macroblocks refer to the same frame. For example, two partition entries in two different macroblocks may each have a reference frame index of "2" associated with its first motion vector. This does not, however, indicate that both first motion vectors are based upon the same frame.

This causes inefficiency, for example, in the deblocking filter stage of the decoding process. In the deblocking filter stage, it is determined, for two partitions of two time adjacent macroblocks, whether the first and second motion vectors of the partitions are identical in value (or within a predetermined variance) and whether the first and second motion vectors are based upon the same frame. If so, this indicates that the motion of the partitions are identical (or nearly identical) whereby a different filtering process (e.g., weaker filtering process) is then applied.

Typically, an inefficient process is used to determine whether the first and second motion vectors of the two partitions are based upon the same frame. This process requires for each partition: retrieval of the reference frame indexes associated with the motion vectors, retrieval of the reference frame lists, determination of the frame numbers in the reference frame lists specified by the reference frame indexes. The process then requires a comparison of the frame numbers to determine whether the frames are the same.

In some embodiments, a canonical reference frame list is created and stored and used for all slices of a frame or all frames of a sequence. In some embodiments, the canonical reference frame list is not modified during the decoding process. FIG. 13 shows an example of a canonical reference frame list.

In some embodiments, reference frame indexes in a partition entry are mapped to canonical reference frame indexes. In these embodiments, the reference frame indexes are used in conjunction with the associated reference frame lists to determine the frame numbers indicated by the reference frame indexes. Matching frame numbers are then located in the canonical reference frame list to determine the entry numbers (canonical reference frame indexes) in the canonical reference frame list containing the matching frame numbers. The determined canonical reference frame indexes are then stored in the unused bytes of the partition entry. In the example shown in FIG. 9, data for the canonical reference frame indexes 935 comprise two bytes of the unused bytes 525.

Figure 1:
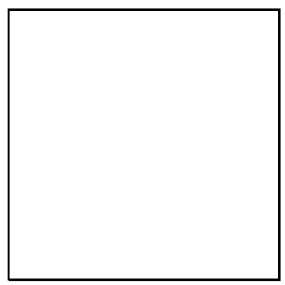
FIG. 1 illustrates the different ways that a macroblock can be partitioned in the H.264 compression standard.
Figure 1:
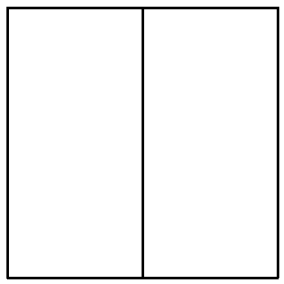
Figure 1:
Figure 1:
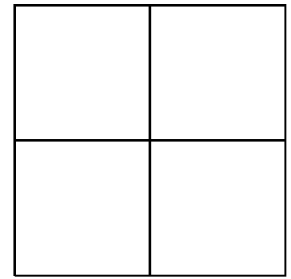
Figure 2:
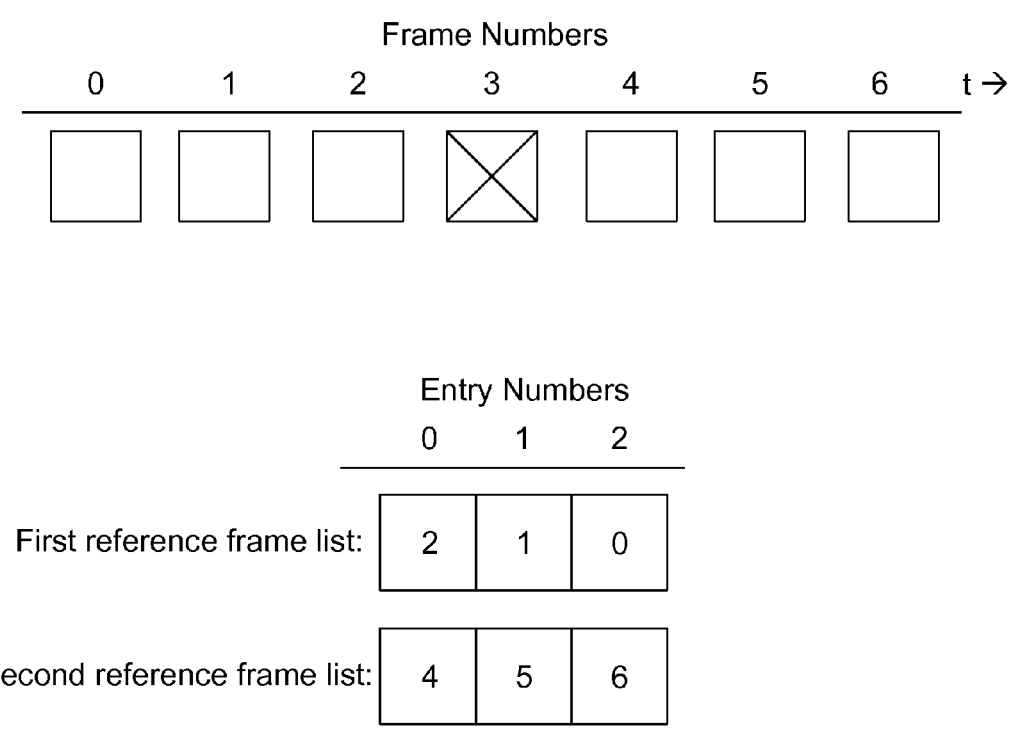
FIG. 2 illustrates the concept of reference frame indexes and reference frame lists.

The following is an example of the mapping process using the canonical reference frame list shown in FIG. 13 and the first and second reference frame lists of FIG. 2. Assume that a first reference frame index "2" and a second reference frame index "0" are contained in a partition entry. The first reference frame list associated with reference frame index "2" contains frame numbers 2, 1, and 0 at entry numbers 0, 1, and 2, respectively. As such, reference frame index "2" indicates frame number 0. In the canonical reference frame list, the frame number 0 matches the frame number in entry 0. As such, the reference frame index 2 is mapped to the canonical reference frame index 0. Similarly, the second reference frame list associated with second reference frame index "0" contains frame numbers 4, 5, and 6 at entry numbers 0, 1, and 2, respectively. As such, second reference frame index "0" indicates frame number 4. In the canonical reference frame list, the frame number 4 matches the frame number in entry 3. As such, the second reference frame index 0 is mapped to the canonical reference frame index 3.

In some embodiments, a single canonical reference frame list is created and stored. In other embodiments, a first canonical reference frame list that is used to identify particular frames for first motion vectors and a second canonical reference frame list that is used to identify particular frames for second motion vectors are created and stored.

In these embodiments, there is the added overhead of creating the canonical reference frame list(s) and the mapping of reference frame indexes to canonical reference frame indexes. Once these operations are performed, however, the process for determining whether the motion vectors of two partitions are based upon the same frame is reduced in time. In these embodiments, to perform this determination, only the canonical reference frame indexes of the partitions need to be retrieved and compared. Also, it is not required that the frame numbers indicated by the canonical reference frame indexes be determined since the actual value of the frame number is not necessary. This is due to the fact that since the canonical reference frame indexes are indexing the same canonical reference frame list, the canonical reference frame indexes having the same value are thereby specifying the same frame number.

Figure 14:
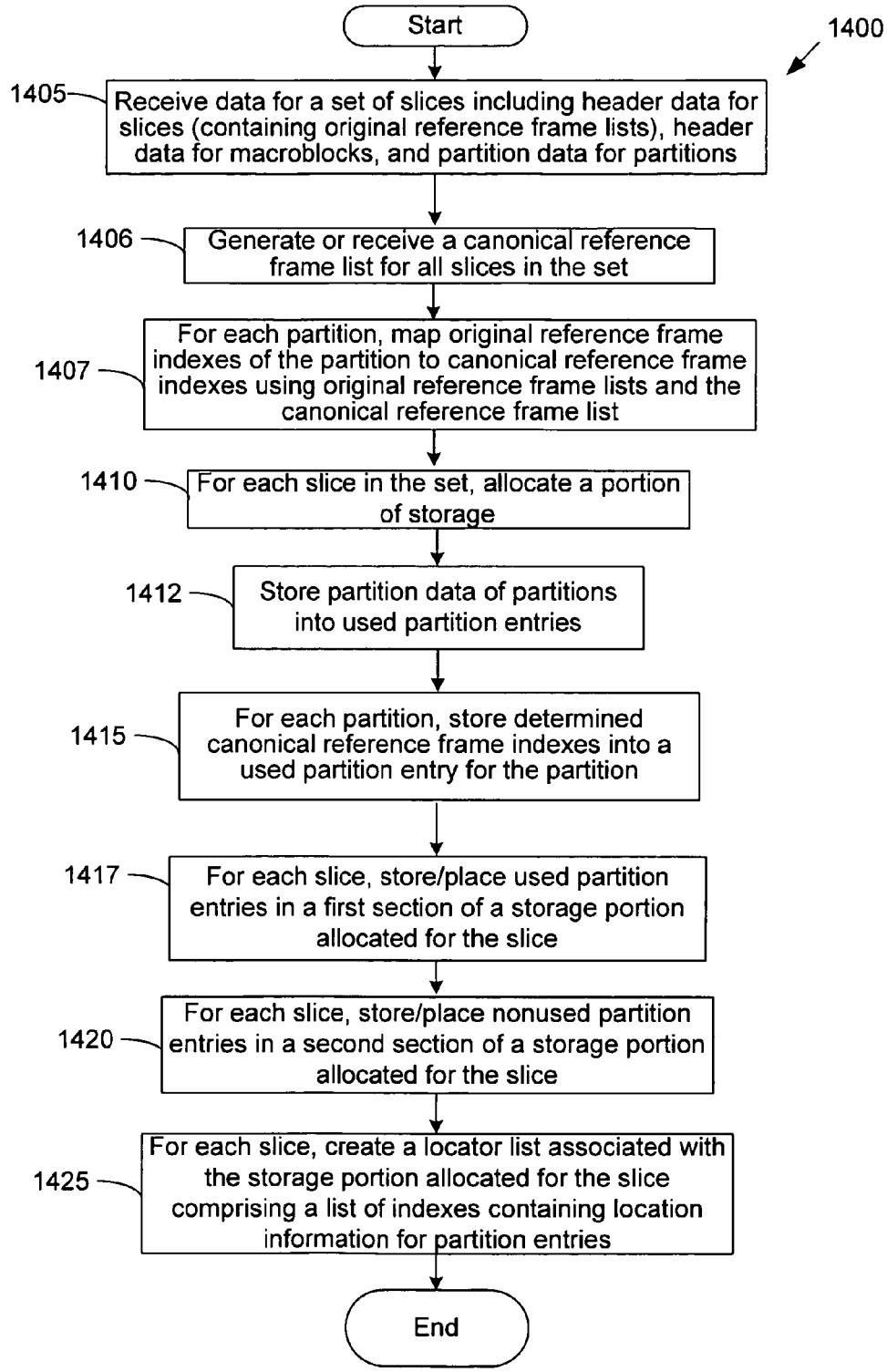
FIG. 14 is a flowchart of a method for storing data for a set of slices of a frame in a sequence of frames using canonical reference frame indexes.

FIG. 14 is a flowchart of a method 1400 for storing data for a set of slices of a frame in a sequence of frames using canonical reference frame indexes. The method 1400 may be performed, for example, by an application configured to encode or decode video data streams using a data storage structure.

The method 1400 begins by receiving (at 1405) data for a set of one or more slices of a video frame, each slice containing two or more macroblocks where each macroblock comprises one or more partitions. The data for the set of slices includes header data for each slice (containing data for one or more original reference frame lists), partition data (motion vector and original reference frame index data) associated with partitions of the macroblocks, and header data for each macroblock. In some embodiments, the motion vector and original reference frame index data for a partition comprises data for first and second motion vectors and associated first and second original reference frame indexes. The first original reference frame index specifies an entry (containing a frame number) in an associated first original reference frame list (which can be derived from the header data of the slice in which the partition is included) that indicates a specific frame in the sequence of frames that the first motion vector is based upon. Likewise, the second original reference frame index specifies an entry in an associated second original reference frame list (which can be derived from the header data of the slice in which the partition is included) that indicates a specific frame in the sequence of frames that the second motion vector is based upon.

The method then generates or receives (at 1406) a canonical reference frame list to be used for all slices in the set of slices. The canonical reference frame list comprises a list of canonical reference frame indexes (entry numbers) and a list of frame numbers, each frame number corresponding to a particular canonical reference frame index. In some embodiments, a single canonical reference frame list is generated for mapping first and second original reference frame indexes (as discussed below). In other embodiments, first and second canonical reference frame lists are generated for mapping first and second original reference frame indexes, respectively.

For each partition of a macroblock in the received set of slices, the method 1400 maps (at 1407) the first and second original reference frame indexes associated with the partition to first and second canonical reference frame indexes, respectively, using the original reference frame lists and the canonical reference frame list. The method may do so by determining the frame number indicated by an original reference frame index in an original reference frame list associated with the partition, matching the frame number in the canonical reference frame list, and determining the canonical reference frame index corresponding to the matching frame number. As such, the first and second canonical reference frame indexes indicate the frames that the first and second motion vectors associated with the partition, respectively, are based upon.

Note that the same canonical reference frame list is used to map original reference frame indexes of partitions to canonical reference frame indexes. This is true even though the original reference frame indexes may be based on different original reference frame lists (e.g., when the partitions associated with the original reference frame indexes are in different slices in the received set of slices). As a result, any partitions in any of the slices in the set having the same associated canonical reference frame indexes refer to and indicate the same frame in the sequence of frames even if the partitions are included in different slices. As discussed above, this characteristic of the canonical reference frame indexes can provide advantages in subsequent processing of the partitions.

For each slice in the set of slices, the method 1400 then allocates (at 1410) a specific portion of the storage structure for storing data of the slice. In these embodiments, a predetermined number of partition entries are allocated for each macroblock of each slice. The method then stores (at 1412) partition data associated with partitions of the slice into the allocated partition entries (referred to as used partition entries).

For each partition in the received set of slices, the method 1400 then stores (at 1415) the first and second canonical reference frame indexes associated with the partition into a used partition entry for the partition. The method may do so by storing data for the first and second canonical reference frame indexes in any unused bytes of the partition entry for the partition. In some embodiments, the data for the first and second canonical reference frame indexes comprises 2 bytes of the unused bytes of a used partition entry.

In some embodiments, for each slice (comprising a plurality of partitions) the method 1400 also stores/places (at 1417) used partition entries (containing data for a partition in the slice) in a first section of a storage portion allocated for the slice. In some embodiments, for each slice, the method 1400 also stores/places (at 1420) nonused partition entries (entries not containing data of a partition) in a second section of the storage portion allocated for the slice. In some embodiments, for each slice, the method 1400 creates (at 1425) a locator list that is associated with the allocated storage portion for the slice, the locator list comprising a list of indexes that contain location information for partition entries in the allocated portion. The method then ends.

Other Uses of Unused Bytes in Partition Entry

As discussed above, a partition entry contains 6 unused bytes. In some embodiments, integrated header data 930 is stored in the unused bytes of a first partition of a macroblock. In some embodiments, canonical reference frame indexes 935 are calculated and stored in the unused bytes of each partition entry.

In other embodiments, the unused bytes of a partition entry are used for any purpose that allows the encoding or decoding of the partition to be more efficient. In some embodiments, the unused bytes of a partition entry are used to store identified or calculated data that facilitates the encoding or decoding of the partition. For example, a number of partitions of the macroblock can be calculated and stored in the unused bytes of a first partition of the macroblock. This avoids the need for later calculation of the number of partitions during decoding. In the example shown in FIG. 9, the data for the number of partitions 940 comprises one byte of the unused bytes.

In the example shown in FIG. 9, data in the used bytes 525 (such as integrated header data 930 and data for the canonical reference frame indexes 935) are shown in a particular order in the partition entry 900. One with ordinary skill in the arts, however, will realize other orders of data are also possible.

Coalescence of Partitions:

In some embodiments, when some or all partitions of the same macroblock have the same motion vectors and the same reference frame indexes (referred to as identical partitions), the identical partitions are grouped (coalesced) into a single partition for decoding purposes. In this situation, only one partition entry would need to be saved for the macroblock rather than multiple partition entries, thus reducing storage overhead.

Figure 15A:
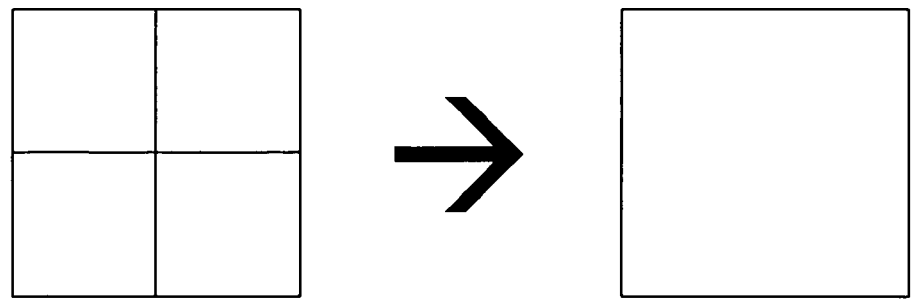
FIGS. 15A-B show examples of coalesced partitions.
Figure 15B:
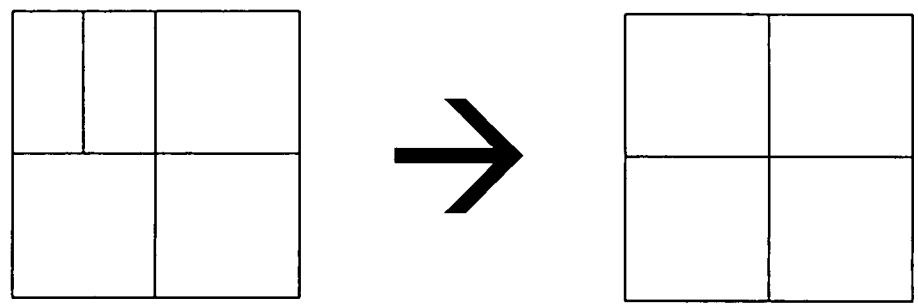

FIG. 15A shows an example of when all four partitions of the same macroblock have the same motion vectors and reference frame indexes, the four partitions are coalesced into a single partition for decoding purposes. As such, only one partition entry would need to be saved for the macroblock rather than four partition entries. FIG. 15B shows an example of when two of five partitions of the same macroblock have the same motion vectors and reference frame indexes, the two identical partitions being located in the upper left side of the macroblock. As shown in FIG. 15B, the two identical partitions are coalesced into a single partition so that only four partition entries would need to be saved for the macroblock rather than five partition entries.

In some embodiments, the coalescing method is used in conjunction with the partition entry packing method (discussed above in relation to FIG. 6) of the present invention. In these embodiments, before used partition entries of a macroblock are packed into a first section of an allocated portion of a storage structure, partitions of the macroblock are checked to determine if there any identical partitions in the macroblock. If so, the identical partitions of the macroblock are grouped into a single partition and a single partition entry for the identical partitions is stored to the first section of the allocated portion.

When partitions of the same macroblock have the same first and second motion vectors and the same first and second reference frame indexes, it is more efficient to treat the identical partitions as a single partition. Although there is the initial time overhead for performing the motion vector and reference frame index comparisons, once the identical partitions are coalesced as a single partition, every decoding stage can be executed faster since, to perform any decoding function, only one operation will need to be performed on a larger coalesced partition rather than several operations on several smaller partitions. This is more time efficient since, for every decoding function to be performed on the coalesced partition, only one loading operation and only one call to the decoding function is needed rather than multiple loading operations and multiple calls to the decoding function.

Note that partitions of the same macroblock use the same reference frame list since the same reference frame list is used for all macroblocks of the same slice. As such, the actual frame numbers specified by the reference frame indexes need not be determined and compared since the reference frame indexes are used in conjunction with the same reference frame lists.

Figure 16:
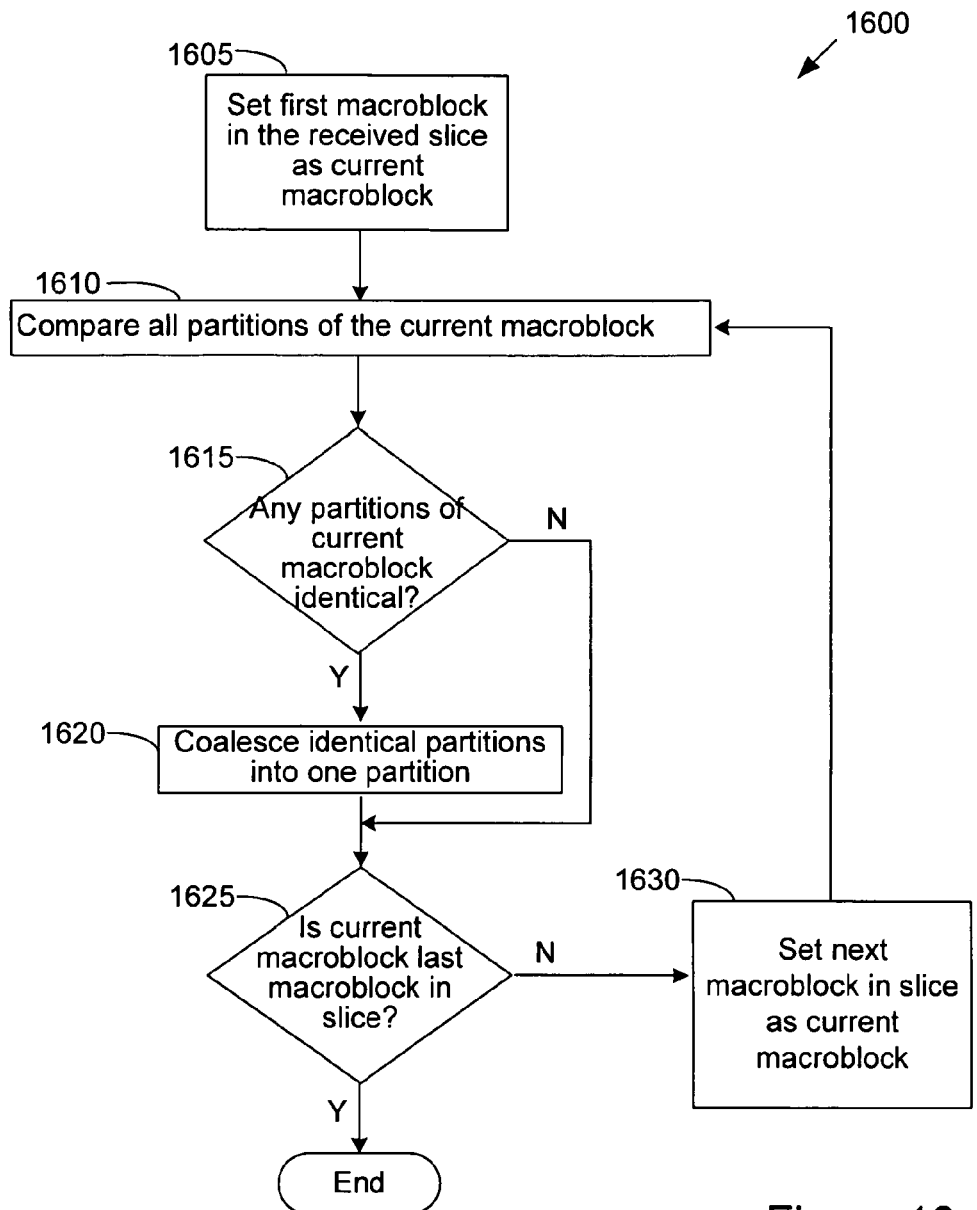
FIG. 16 is a flowchart of a method for coalescing partitions of macroblocks.

FIG. 16 is a flowchart of a method 1600 for coalescing partitions of macroblocks of a video slice. In some embodiments, the method 1600 comprises step 807 of the method 800 described in relation to FIG. 8. In the method 800 of FIG. 8, the method 800 receives (at 805) data for a slice of a video frame, the slice containing two or more macroblocks where each macroblock comprises one or more partitions. The data for the slice includes partition data (e.g., motion vector and reference frame index data) associated with partitions of the macroblocks of the slice and header data for each macroblock.

The method 1600 begins by setting (at 1605) a first macroblock in the received slice as a current macroblock. The method 1600 then compares (at 1610) all partitions of the current macroblock by comparing the partition data (motion vector and reference frame index data) associated with the partitions. The method then determines (at 1615) whether any partitions of the current macroblock are identical (i.e., whether the motion vector and reference frame index data associated with any of the partitions are identical). If so, the method coalesces (at 1620) identical partitions of the current macroblock into one partition and proceeds to step 1625. If not, the method proceeds directly to step 1625.

At step 1625, the method determines if the current macroblock is the last macroblock in the slice. If not, the method sets (at 1630) a next macroblock as the current macroblock and continues at step 1610. If so, the method ends.

Figure 17:
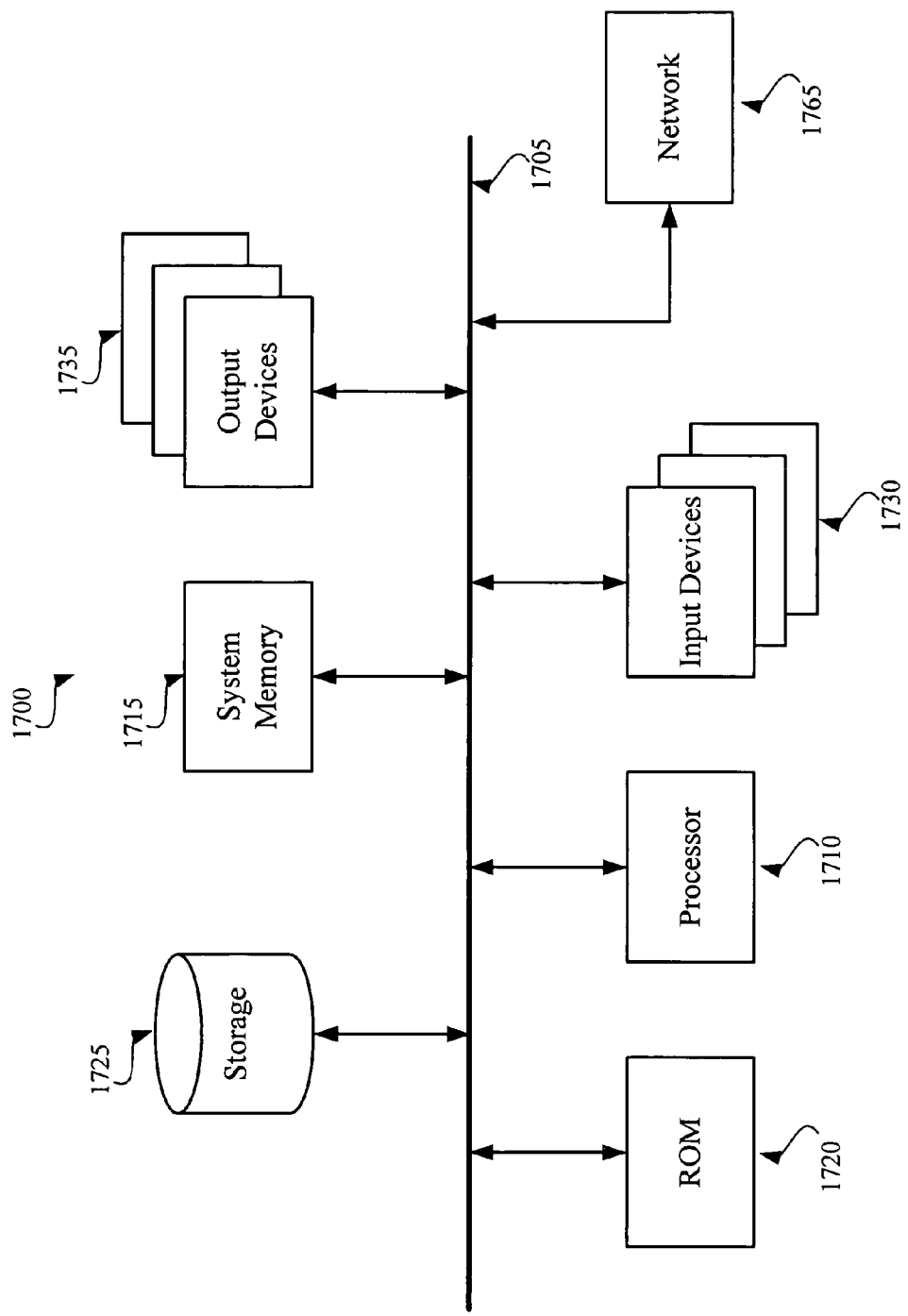
FIG. 17 presents a computer system with which some embodiments of the invention are implemented.

FIG. 17 presents a computer system 1700 with which some embodiments of the invention are implemented. The computer system 1700 includes a bus 1705, a processor 1710, a system memory 1715, a read-only memory 1720, a permanent storage device 1725, input devices 1730, and output devices 1735.

The bus 1705 collectively represents all system, peripheral, and chipset buses that communicatively connect the numerous internal devices of the computer system 1700. For instance, the bus 1705 communicatively connects the processor 1710 with the read-only memory 1720, the system memory 1715, and the permanent storage device 1725.

The read-only-memory (ROM) 1720 stores static data and instructions that are needed by the processor 1710 and other modules of the computer system. The permanent storage device 1725, on the other hand, is read-and-write memory device. This device is a non-volatile memory unit that stores instruction and data even when the computer system 1700 is off. Some embodiments of the invention use a mass-storage device (such as a magnetic or optical disk and its corresponding disk drive) as the permanent storage device 1725. Other embodiments use a removable storage device (such as a floppy disk or Zip® disk, and its corresponding disk drive) as the permanent storage device.

Like the permanent storage device 1725, the system memory 1715 is a read-and-write memory device. However, unlike storage device 1725, the system memory is a volatile read-and-write memory, such as a random access memory (RAM). The system memory stores some of the instructions and data that the processor needs at runtime.

In some embodiments, instructions and/or data needed to perform methods of the present invention are stored in the system memory 1715, the permanent storage device 1725, the read-only memory 1720, or any combination of the three. For example, the various memory units may contain instructions for encoding or decoding video data in accordance with methods of the present invention and/or contain video data. From these various memory units, the processor 1710 retrieves instructions to execute and data to process in order to execute the processes of the present invention.

The bus 1705 also connects to the input and output devices 1730 and 1735. The input devices 1730 enable a user to communicate information and select commands to the computer system 1700. The input devices 1730 include alphanumeric keyboards and cursor-controllers. The output devices 1735 display images generated by the computer system 1700. The output devices include printers and display devices, such as cathode ray tubes (CRT) or liquid crystal displays (LCD).

Finally, as shown in FIG. 17, the bus 1705 also couples the computer system 1700 to a network 1765 through, for example, a network adapter (not shown). In this manner, the computer system 1700 can be a part of a network of computers (such as a local area network ("LAN"), a wide area network ("WAN"), or an Intranet) or a network of networks (such as the Internet). Any or all of the components of the computer system 1700 may be used in conjunction with the present invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, many embodiments of the invention were described above by reference to macroblocks. One of ordinary skill will realize that these embodiments can be used in conjunction with any other array of pixel values.

We claim:

1. A method of identifying a partition configuration of a pixel group in a video picture, the method comprising:
   receiving the pixel group comprising a set of partitions, each partition comprising a plurality of pixels, the pixel group comprising information that identifies position and dimensions for each partition of the pixel group;
   identifying a partition configuration of the pixel group based on said information, wherein the partition configuration identifies a manner in which the pixel group is partitioned into a set of partitions from a plurality of unique candidate combinations of partitions, each unique candidate combination of partitions specifying a set of partitions, wherein no candidate combination of partitions specifies a set of partitions that is identical to a set of partitions specified by another candidate combination of partitions;
   specifying a partition configuration value for the pixel group, wherein the partition configuration value uniquely identifies the partition configuration of the pixel group as comprising a particular combination of partitions from the plurality of unique candidate combinations of partitions; and
   using the partition configuration value in conjunction with a partition configuration look up table to decode the pixel group,
   wherein each partition in a specified set has a position and dimensions relative to the pixel group, wherein two candidate combinations of partitions are not identical to each other when one candidate combination of partitions specifies a partition with at least one of a particular position and a particular dimension that the other candidate combination of partitions does not specify.

2. The method of claim 1, wherein said information is header information associated with said pixel group, wherein said pixel group is a macroblock.

3. The method of claim 1, wherein the partition configuration look up table maps the partition configuration value to said plurality of unique candidate combinations of partitions.

4. A non-transitory machine readable medium storing a computer program for identifying a partition configuration of a pixel group in a video picture, the computer program executable by at least one processing unit, the program comprising sets of instructions for:
   receiving the pixel group comprising a set of partitions, each partition comprising a plurality of pixels, the pixel group comprising information that identifies position and dimensions for each partition of the pixel group;
   identifying a partition configuration of the pixel group based on said information, wherein the partition configuration identifies how the pixel group is partitioned into a set of partitions from a plurality of unique candidate combinations of partitions, each unique candidate combination of partitions specifying a set of partitions, wherein no candidate combination of partitions specifies a set of partitions that is identical to a set of partitions specified by another candidate combination of partitions;
   specifying a partition configuration value for the pixel group, wherein the partition configuration value uniquely identifies the partition configuration of the pixel group as comprising a particular combination of partitions from the plurality of unique candidate combinations of partitions; and
   using the partition configuration value in conjunction with a partition configuration look up table to decode the pixel group,
   wherein each partition in a specified set has a position and dimensions relative to the pixel group, wherein two candidate combinations of partitions are not identical to each other when one candidate combination of partitions specifies a partition with at least one of a particular position and a particular dimension that the other candidate combination of partitions does not specify.

5. The non-transitory machine readable medium of claim 4, wherein said information is header information associated with said pixel group, wherein said pixel group is a macroblock.

6. The non-transitory machine readable medium of claim 4, wherein the partition configuration look up table maps the partition configuration value to said plurality of unique candidate combinations of partitions.

* * * * *